US012761738B2

(12) United States Patent
Wang

(10) Patent No.: US 12,761,738 B2
(45) Date of Patent: Oct. 13, 2026

(54) TRANSLATIONAL MOUSE BUTTON MODULE AND MOUSE DEVICE WITH TRANSLATIONAL MOUSE BUTTON MODULE

(71) Applicant: Voyetra Turtle Beach, Inc., San Diego, CA (US)

(72) Inventor: Wei Chuan Wang, New Taipei City (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 19/107,461

(22) PCT Filed: Aug. 30, 2023

(86) PCT No.: PCT/US2023/073183
§ 371 (c)(1),
(2) Date: Feb. 27, 2025

(87) PCT Pub. No.: WO2024/050430
PCT Pub. Date: Mar. 7, 2024

(65) Prior Publication Data

US 2026/0072524 A1 Mar. 12, 2026

(30) Foreign Application Priority Data

Sep. 1, 2022 (TW) .................................. 111133115
Sep. 1, 2022 (TW) .................................. 111209508
(Continued)

(51) Int. Cl.
*G06F 3/02* (2006.01)
*G06F 3/0354* (2013.01)

(52) U.S. Cl.
CPC ........ *G06F 3/0202* (2013.01); *G06F 3/03543* (2013.01)

(58) Field of Classification Search
CPC .. G06F 3/03543; G06F 3/0362; G06F 3/0202; G06F 3/03541
See application file for complete search history.

(56) References Cited

U.S. PATENT DOCUMENTS 7,623,117 B2 11/2009 Hsu
9,063,587 B2 6/2015 Boldin
(Continued)

FOREIGN PATENT DOCUMENTS

CN 214670504 U 11/2021
CN 218547463 U 2/2023
TW I310510 B 6/2009

*Primary Examiner* — Van N Chow
(74) *Attorney, Agent, or Firm* — Sheppard Mullin Richter & Hampton LLP

(57) ABSTRACT

A mouse device may include a casing and a traditional mouse button module arranged therein. The translational mouse button module may include: a frame body with first and second frame body connecting parts; a button plate with a pressing part and a first and second button plate connecting part; and a pressing switch with a button for the pressing part to abut against correspondingly. A side-by-side component may include first and second swing beams arranged side by side, that are respectively rotatably bridged between the first frame body connecting part and the first button plate connecting part, and between the second frame body connecting part and the second button plate connecting part. The button plate can be pulled by the side-by-side component to move in translation.

17 Claims, 4 Drawing Sheets

(30) Foreign Application Priority Data

Sep. 13, 2022 (CN) ......................... 202211108974.2
Sep. 13, 2022 (CN) ........................ 202222415404.X

(56) References Cited

U.S. PATENT DOCUMENTS

| | | | | |
|---|---|---|---|---|
| 10,719,135 | B2 | 7/2020 | Chao | |
| 2007/0035520 | A1* | 2/2007 | Hsu | G06F 3/03543 345/163 |
| 2012/0188160 | A1 | 7/2012 | Wallace | |
| 2013/0321272 | A1* | 12/2013 | Deng | G06F 3/0362 345/163 |
| 2017/0277275 | A1* | 9/2017 | Chao | G06F 3/03543 |
| 2018/0113521 | A1* | 4/2018 | Lai | G06F 3/03543 |
| 2022/0137725 | A1* | 5/2022 | Cheng | G06F 3/03543 345/163 |

* cited by examiner

TRANSLATIONAL MOUSE BUTTON MODULE AND MOUSE DEVICE WITH TRANSLATIONAL MOUSE BUTTON MODULE

CROSS-REFERENCE TO RELATED APPLICATIONS

This application is a National Phase application under 35 U.S.C. § 371 of PCT Application No. PCT/US2023/073183, filed Aug. 30, 2023, which application claims the benefit of Taiwan Invention application No. 111133115, filed Sep. 1, 2022 (which issued as Taiwan Patent No. I822289 on Nov. 11, 2023), Taiwan Utility Model Application No. 111209508, filed Sep. 1, 2022 (which issued as Taiwan Patent No. M637444 on Feb. 11, 2023), Chinese Invention application No. 202211108974.2, filed Sep. 13, 2022, and Chinese Utility Model application No. 202222415404.X, filed Sep. 13, 2022 (which issued as Chinese Patent No. ZL 202222415404.X on Feb. 28, 2023), which are hereby incorporated herein by reference in their entirety.

TECHNICAL FIELD

The present application relates to a mouse button of a mouse, in particular to a translational mouse button module and a mouse device with the translational mouse button module.

BACKGROUND ART

A mouse usually includes: a casing and a switch installed in the casing. The casing is equipped with two button plates. The two button plates are commonly known as the left mouse button and the right mouse button. When a user presses the button plate, the button plate can further press the switch to generate a switch signal.

However, the above mouse has the following deficiencies that need to be improved: one end of each of the two button plate is integrally connected to the casing; accordingly, when the button plate is pressed, the button plate can only swing up and down with the connection joint as the axis. In addition, there is a certain length between this connection end of the button plate and the opposite end; when this length is farther away from the connection end, the required up and down deflection stroke of the button plate can be quite long. This can result in different pressing pressure required for various pressing positions on the button plate. Thus, when a user presses the button plate, the user needs to select a particular pressing position, which may cause a bad pressing experience. On the other hand, the existing mice with certain improvements to address the above issue may have the problem of a complicated structure, which leads to the deficiency of manufacturing difficulties.

Therefore, how to make the button plate perform a translational movement when being pressed and meanwhile maintain a relatively simple structure becomes a significant technical problem that the inventors of the present application want to solve.

SUMMARY

In order to solve the aforementioned problems in the existing technologies, the present application proposes a translational mouse button module and a mouse device with the translational mouse button module, which allow the button plate to change to translational movement when pressed; in addition, the structure thereof is not complicated.

In some implementations, a translational mouse button module and a mouse device with the translational mouse button module are provided, in which the mouse device may include a casing and the translational mouse button module arranged in the casing. The translational mouse button module may include: a frame body, a button plate, a pressing switch and a side-by-side component. The frame body has a first frame body connecting part and a second frame body connecting part; the button plate has a pressing part, a first button plate connecting part, and a second button plate connecting part; the pressing switch configured corresponding to the pressing part has a button for the pressing part to abut against it correspondingly; the side-by-side component may include a first swing beam and a second swing beam arranged side by side, the first swing beam and the second swing beam are respectively rotatably bridged between the first frame body connecting part and the first button plate connecting part, and between the second frame body connecting part and the second button plate connecting part. In this way, the button plate can be pulled by the side-by-side component to move in translation, such that a user no longer needs to select the part to press on the button plate in order to have a better pressing experience. In addition, since the structure is not complicated, it has the effect of being easy to manufacture.

The translational mouse button module provided by the present application may include: a frame body, including a first frame body connecting part and a second frame body connecting part; a button plate, including a pressing part, a first button plate connecting part, and a second button plate connecting part; a pressing switch, configured corresponding to the pressing part and having a button, where the pressing part correspondingly abuts against the button; and a side-by-side component, including a first swing beam and a second swing beam arranged side by side with each other; the first swing beam is swingably bridged between the first frame body connecting part and the first button plate connecting part, and the first swing beam can swing relative to the frame body with the first frame body connecting part as an axis; the second swing beam is swingably bridged between the second frame body connecting part and the second button plate connecting part, and the second swing beam can swing relative to the frame body with the second frame body connecting part as an axis. When the button plate is pressed, the first swing beam and the second swing beam pull the button plate to translate relative to the frame body by means of swinging relative to the frame body.

The mouse device with a translational mouse button module provided by the present application may include: a casing with at least one opening; and at least one translational mouse button module as set forth in the preceding paragraph, which is arranged in the casing, and the button plate thereof is exposed from the opening.

Compared with the existing technologies, the translational mouse button module and the mouse device with the translational mouse button module provided by the present application can move in translation by allowing the button plate to be pulled by the side-by-side component when the button plate is pressed. Therefore, any point on the button plate can be pressed with a similar pressing force and a similar pressing stroke. As a result, a user does not need to select a particular pressing position, and therefore has a better pressing experience. In addition, the structure of the translation mouse button module is not complicated, so it also has the effect of being easy to manufacture.

Figure 1:
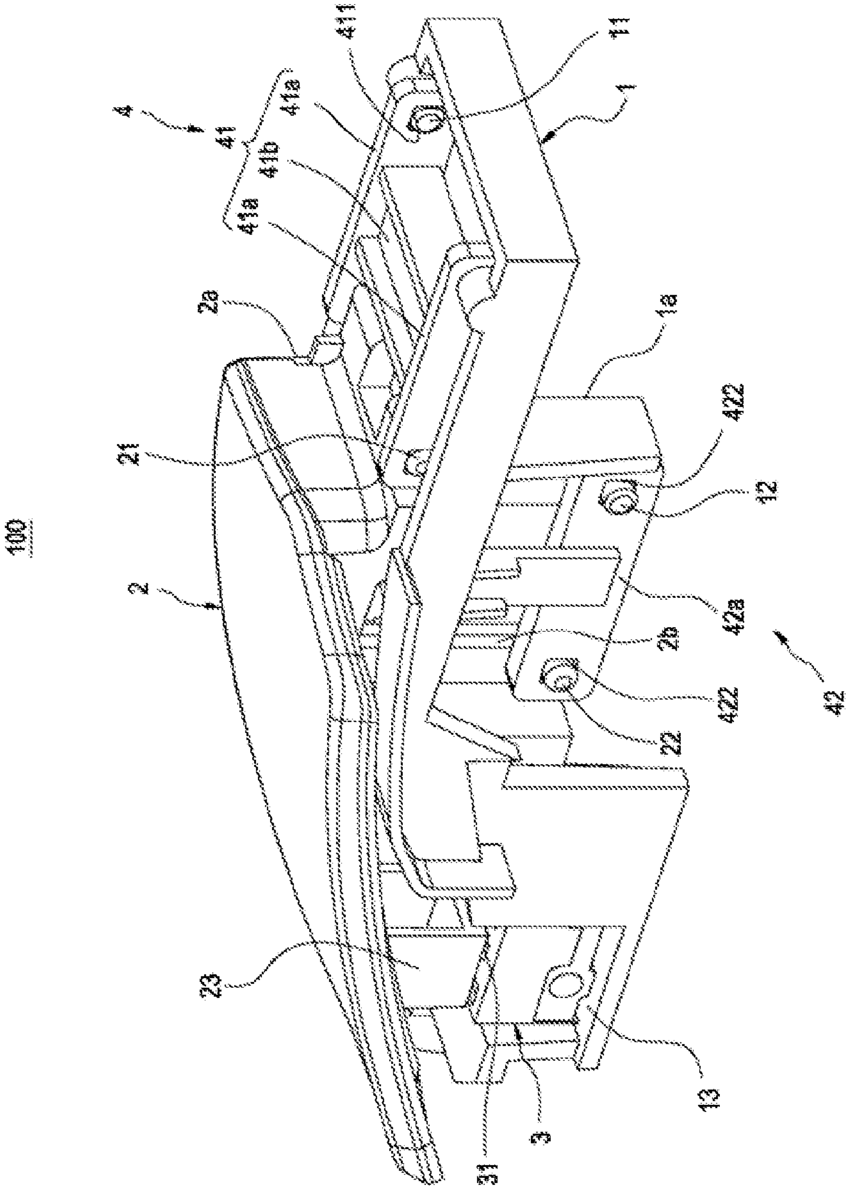
FIG. 1 is a perspective assembly diagram of the mouse button module according to the present application.

Description of the element Symbols shown in the drawings:

100: mouse button plate module;
1: frame body;
1*a*: protruding arm;
11: first frame body connecting part;
12: second frame body connecting part;
13: mounting part;
2: button plate;
2*a*: first extension arm;
2*b*: second extension arm;
21: first button plate connecting part;
22: second button plate connecting part;
23: pressing part;
3: pressing switch;
31: button;
4: side-by-side component;
41: first swing beam;
41*a*: beam body;
41*b*: connecting part;
411: first abutting part;
42: second swing beam;
42*a*: beam body;
422: second abutting part;
700: circuit board;
800: casing;
8: opening.

DESCRIPTION OF THE EMBODIMENTS

The detailed description and technical contents of the present application will be described below in conjunction with the drawings. However, the accompanying drawings are only used for illustration purposes, and are not used to limit the present application.

The present application provides a translational mouse button module and a mouse device with the translational mouse button module. With reference to FIG. 1 to FIG. 4, a translational mouse button module according to the present application is shown; with reference to FIG. 5, a mouse device with the translational mouse button module (hereinafter referred to as the mouse device) according to the present application is shown.

Figure 2:
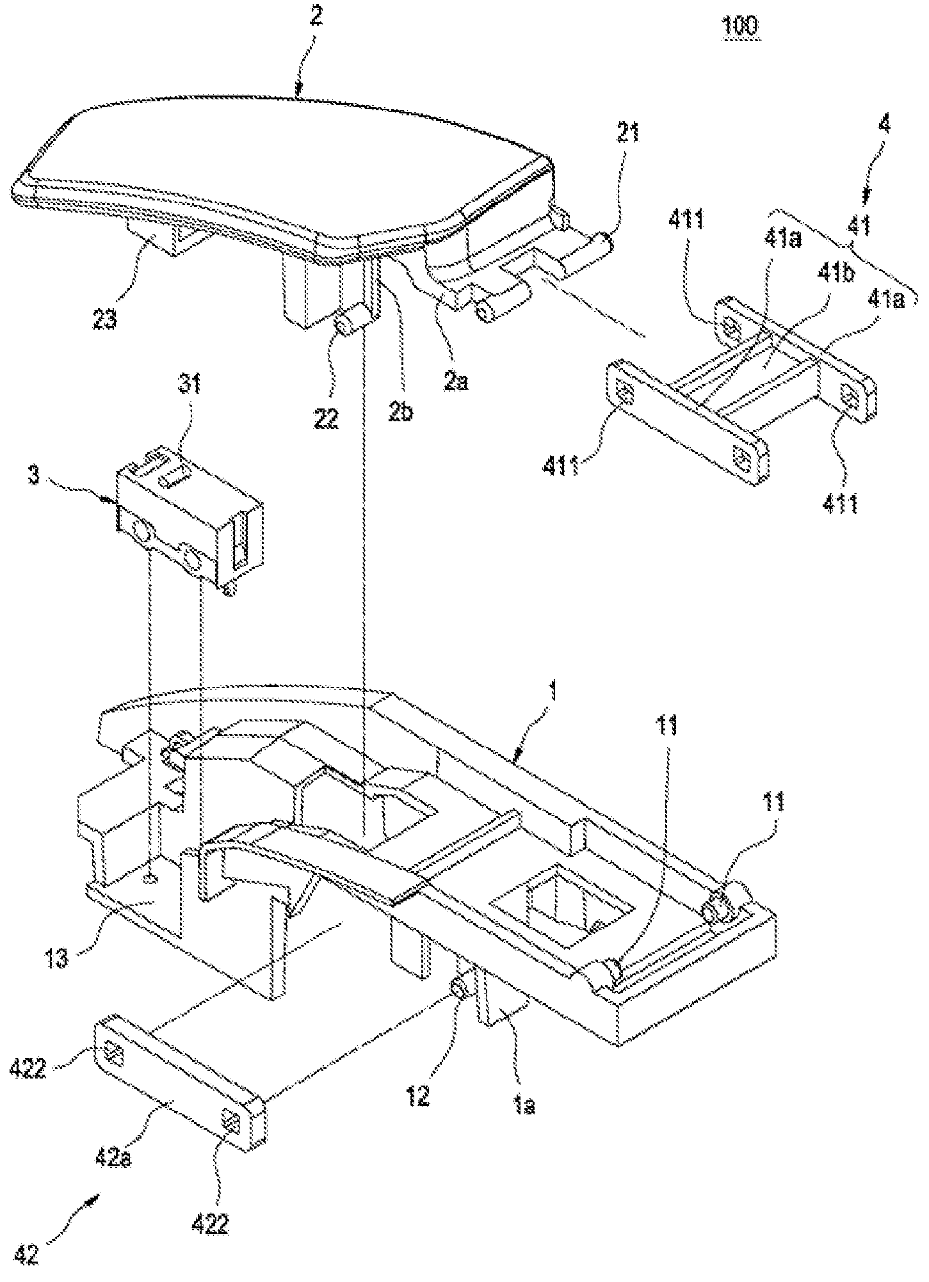
FIG. 2 is a perspective exploded diagram of the mouse button module according to the present application.
Figure 3:
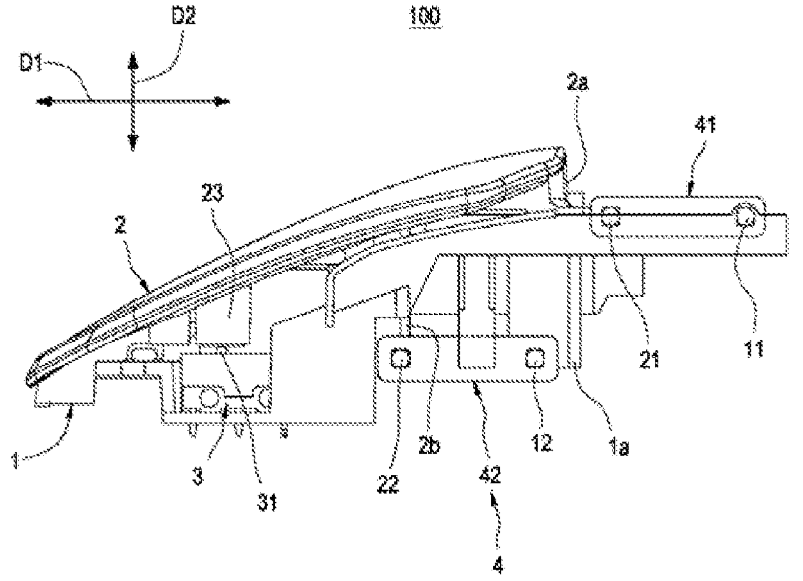
FIG. 3 is a schematic side view of the mouse button module before it is pressed according to the present application.

As shown in FIG. 1 to FIG. 4, the translational mouse button module 100 (hereinafter referred to as the mouse button module) according to the present application may include: a frame body 1, a button plate 2, a pressing switch 3, and a side-by-side component 4. It should be noted that, as shown in FIG. 2 and FIG. 3, the button plate 2 is an elongated plate with a thickness. Accordingly, in addition to having the thickness, it also has a length. As shown in FIG. 3, the mouse button module 100 defines a first direction D1 and a second direction D2 perpendicular to each other, where the first direction D1 corresponds to the length of the button plate 2 (that is, the X axis), and the second direction D2 corresponds to the thickness of the button plate 2 (that is, the Z axis, so the Y axis corresponds to the width of the button plate 2).

The frame body 1 is provided to support the button plate 2 and the side-by-side component 4. In an embodiment, a pressing switch 3 can also be provided. The frame body 1 has at least a first frame body connecting part 11 and a second frame body connecting part 12. The number of the first frame body connecting part 11 can be one (not shown in the figures), or two (as shown in FIG. 2), which is not limited in the present application. The number of the second frame body connecting part 12 can be one (as shown in FIG. 2), or two (not shown in the figures), which is not limited in the present application. In the following description, the number of the first frame body connecting part 11 and the number of the second frame body connecting part 12 are both set as one, which is the basic mode thereof.

The button plate 2 (that is, the mouse button) is a plate body, and has a first button plate connecting part 21, a second button plate connecting part 22, and a pressing part 23. In one embodiment, the second button plate connecting part 22 is located between the first button plate connecting part 21 and the pressing part 23. In other embodiments not shown in the drawings, the second button plate connecting part 22 may be located in front of the pressing part 23. That is, the pressing part 23 is located between the first button plate connecting part 21 and the second button plate connecting part 22.

The pressing switch 3 is configured correspondingly to the pressing part 23. In other words, the pressing switch 3 can be arranged on the frame body 1 as shown in FIG. 1 to FIG. 4, or it can be arranged directly on a circuit board 700 (not shown) in the mouse device of the present application shown in FIG. 5. In one embodiment, the frame body 1 may further include a mounting part 13, and the pressing switch 3 can be arranged on the mounting part 13, so that the pressing switch 3 can form a full module with the mouse button module 100 of the present application. Thus, the present application has an effect of precise alignment and no error between the pressing part 23 and a button 31 of the pressing switch 3 which will be described below. It should be noted that the pressing switch 3 can have the button 31, and the pressing part 23 abuts against the button 31 correspondingly. Thus, the connection state (ON) can be controlled by means of pressing the button 31 via the pressing part 23. In addition, the button 31 can be elastically reset. For example, an elastic element not shown in the figure may be used to elastically reset the button 31 along the aforementioned first direction D1, so as to make it return to the disconnection state (OFF) after the resetting.

The side-by-side component 4 in this example includes a first swing beam 41 and a second swing beam 42 arranged side by side with each other. As shown in FIG. 3, the first swing beam 41 and the second swing beam 42 are spaced side by side along the second direction D2 and staggered along the first direction D1, thus forming a virtual parallelogram. The first swing beam 41 is swingably bridged between the first frame body connecting part 11 and the first button plate connecting part 21, so that the first swing beam 41 can swing relative to the frame body 1 with the first frame body connecting part 11 as the axis. The second swing beam 42 is swingably bridged between the second frame body connecting part 12 and the second button plate connecting part 22, so that the second swing beam 42 can swing relative to the frame body 1 with the second frame body connecting part 12 as the axis.

Figure 4:
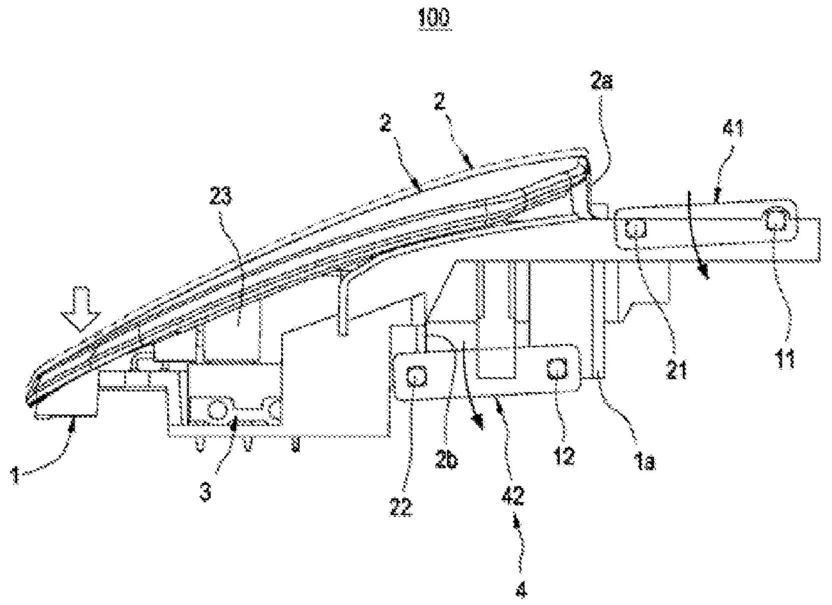
FIG. 4 is a schematic side view of the mouse button module after it is pressed according to the present application.

In one embodiment, as shown in FIG. 3 and FIG. 4, the second frame body connecting part 12 is located between the first frame body connecting part 11 and the button 31 (or the pressing switch 3) in the first direction D1; in addition, the position of the first frame body connecting part 11 in the second direction D2 is higher than the positions of the second frame body connecting part 12 and the button 31 (or the pressing switch 3) in the second direction D2. In this way, it is ensured that the button plate 2 can translate relative to the frame body 1 by means of the swinging movement of the side-by-side component 4.

In this way, as shown in FIG. 3 and FIG. 4, when a user presses the button plate 2, the first swing beam 41 and the second swing beam 42 can swing relative to the frame body 1, and through their swinging movement, the button plate 2 can be pulled and driven to have a translational movement relative to the frame body 1. As a result, the mouse button module 100 of the present application has the effect of being easy to manufacture because the structure is relatively uncomplicated. In addition, a user can press any position on the button plate 2 with a similar pressing force and a similar pressing stroke, so that the user does not need to select a particular pressing position when pressing the button plate 2, thereby having a better pressing experience.

In one embodiment, as shown in FIG. 2, the first swing beam 41 and the second swing beam 42 may be configured as follows: the second swing beam 42 is a rectilinear beam body (or beam body for short) 42*a* lying on a side thereof and arranged in the middle, and the first swing beam 41 can be two rectilinear beam bodies (or beam bodies for short) 41*a* lying on sides thereof, which are spaced apart side by side and connected to each other. In some other embodiments that are not shown in the drawings, the first swing beam 41 and the second swing beam 42 each can have two rectilinear beam bodies 41*a*, 42*a* lying on sides thereof, which are spaced apart side by side and connected to each other. When the number of the aforementioned first frame body connecting part 11 is two, as shown in FIG. 2, it is suitable for the first swing beam 41 as shown in FIG. 2 (which, in this example, includes a connecting part 41*b* and two beam bodies 41*a*). This makes the swinging movement of the side-by-side component 4 more stable. In the following description, both the first swinging beam 41 and the second swinging beam 42 are described as a rectilinear beam body 41*a*, 42*a*, respectively (not shown), which is the basic mode thereof.

It should be noted that, as shown in FIG. 2, the first swing beam 41 is configured as two beam bodies 41*a* with a connecting part 41*b* connected therebetween.

Specifically, the button plate 2 has an inner surface (not labeled with an element symbol), and the pressing part 23 is formed on the inner surface. In an embodiment, a first extension arm 2*a* and a second extension arm 2*b* may also be formed on the inner surface. The aforementioned first button plate connecting part 21 and the second button plate connecting part 22 may be formed on an extension end of the first extension arm 2*a* and an extension end of the second extension arm 2*b*, However, the present application does not limit the formation positions of the first button plate connecting part 21 and the second button plate connecting part 22 on the respective extension arms (2*a*, 2*b*).

In addition, the pressing part 23, the first extension arm 2*a* and the second extension arm 2*b* can all extend from the inner surface along the aforementioned second direction D2 as shown in FIG. 2 and FIG. 3. Alternatively, the first extension arm 2*a* may be made to extend from the periphery of the button plate 2 (not shown in the figures). In one embodiment, the first extension arm 2*a* firstly extends from the inner surface of the button plate 2 along the second direction D2 as shown in FIG. 2, and then bends to extend along the first direction D1 (such that the first extension arm 2*a* is formed into an L shape).

Moreover, the frame body 1 can also have a protruding arm 1*a* along the second direction D2. The second frame body connecting part 12 can be formed on the protruding arm 1*a*.

Furthermore, as shown in FIG. 1 to FIG. 4, the first swing beam 41 can have two first abutting parts 411; the aforementioned first frame body connecting part 11 and the first button plate connecting part 21 are respectively rotatably connected to the two first abutting parts 411 of the first swing beam 41. In addition, the second swing beam 42 can have two second abutting parts 422; the aforementioned second frame body connecting part 12 and the second button plate connecting part 22 are respectively rotatably connected to the two second abutting parts 422 of the second swing beam 42.

It is worth noting that, by means of connecting the side-by-side component 4 between the button plate 2 and the frame body 1, the side-by-side component 4 can properly pull the button plate 2. In this way, even if there is an improper gap (not shown in the figures) between the pressing part 23 and the button 31 due to tolerance issues, the mouse button module 100 of the present application can still pull the button plate 2 with the side-by-side component 4, so as to pull the button plate 2 together with the pressing part 23 thereof in a direction toward the pressing switch 3 so as to eliminate the improper gap; this can even further eliminate the noise generated by the button plate 2 due to shaking or vibration.

Figure 5:
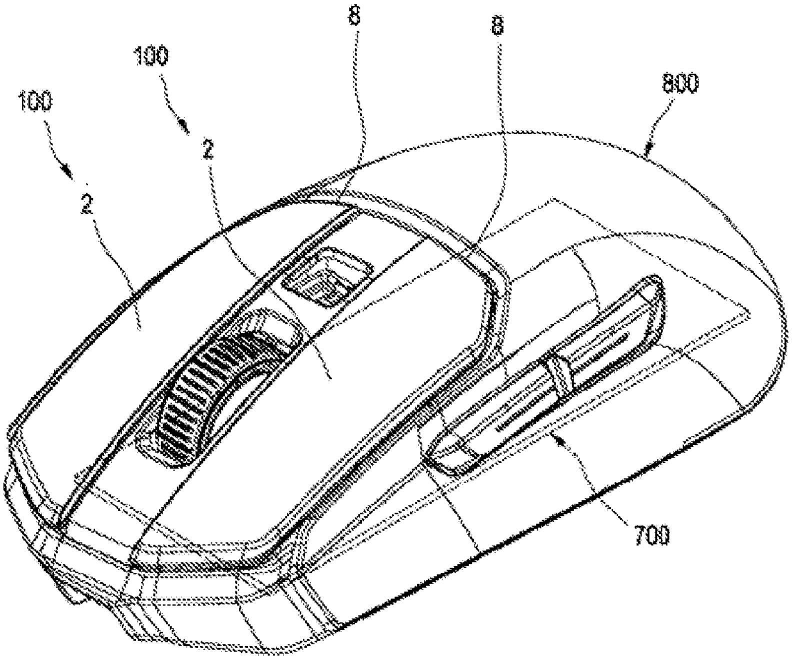
FIG. 5 is a schematic perspective assembly diagram of the mouse device according to the present application.

As shown in FIG. 5 together with FIG. 1 and FIG. 2, a mouse device with the translational mouse button module is further provided by the present application (that is, the aforementioned mouse device for short). The mouse device may include: a casing 800 and at least one translational mouse button module (that is, the mouse button module referred to above) 100. The mouse device of the present application does not limit how many mouse button modules 100 should be provided therein. In this embodiment, two mouse button modules are included in the mouse device, which is used as an example for illustration.

The casing 800 is provided with two openings 8. The two mouse button modules 100 are arranged in the casing 800, and the button plates 2 thereof are arranged therein side by side corresponding to the openings 8. In other words, the two button plates 2 are exposed from the openings 8. In addition, a circuit board 700 is also disposed in the casing 800. The aforementioned pressing switch 3 can be arranged on the circuit board 700 (not shown in the figures), or can be arranged on the mounting part 13 of the frame body 1 as shown in FIG. 2 and FIG. 3.

It is worth noting that the button plate 2 of each mouse button module 100 is fully separated from the casing 800. That is to say, the button plate 2 no longer can only swing up and down with the joint as the axis as it is connected to the casing as in the existing technologies. Rather, the button plate 2 of the present application can indeed be pulled and driven by the side-by-side component 4 to move in translation.

In summary, the translational mouse button module and the mouse device with the translational mouse button module provided by the present application can indeed achieve the expected purpose of use and solve the deficiencies in the existing technologies.

The above is only some preferred embodiments of the present application, which do not limit the scope of protection of the present application. It is noted that all equivalent structural changes made based on the contents of the description and drawings of the present application are all included within the scope of protection of the present application.

What is claimed is:

1. A translational mouse button module, comprising:

a frame body, comprising a first frame body connecting part and a second frame body connecting part, wherein the second frame body connecting part is formed along a protruding arm of the frame body;

a button plate, comprising a pressing part, a first button plate connecting part, and a second button plate connecting part;

a pressing switch, configured corresponding to the pressing part and having a button, wherein the pressing part correspondingly abuts against the button; and a side-by-side component, comprising a first swing beam and a second swing beam arranged side by side with each other, wherein the first swing beam is swingably bridged between the first frame body connecting part and the first button plate connecting part, and the first swing beam is configured to swing relative to the frame body with the first frame body connecting part as an axis, the second swing beam is swingably bridged between the second frame body connecting part and the second button plate connecting part, and the second swing beam is configured to swing relative to the frame body with the second frame body connecting part as an axis;

wherein, when the button plate is pressed, the first swing beam and the second swing beam pull the button plate to translate relative to the frame body by swinging relative to the frame body.

2. The translational mouse button module according to claim 1, wherein the second swing beam comprises a rectilinear beam body lying on a side thereof or two rectilinear beam bodies lying on sides thereof, which are spaced apart side by side and connected to each other.

3. The translational mouse button module according to claim 1, wherein the first swing beam comprises two rectilinear beam bodies lying on sides thereof, which are spaced apart side by side and connected to each other.

4. The translational mouse button module according to claim 1, wherein a first direction and a second direction perpendicular to each other are defined, the button plate comprises an elongated plate with a thickness, the first direction corresponds to a length of the button plate, the second direction corresponds to the thickness of the button plate, the second frame body connecting part is located between the first frame body connecting part and the button in the first direction, and a position of the first frame body connecting part in the second direction is higher than positions of the second frame body connecting part and the button.

5. The translational mouse button module according to claim 4, wherein the first swing beam and the second swing beam are spaced side by side in the second direction and staggered from each other in the first direction.

6. The translational mouse button module according to claim 1, wherein the button is configured for elastic reset.

7. The translational mouse button module according to claim 1, wherein the first swing beam comprises two first abutting parts, the second swing beam comprises two second abutting parts, the two first abutting parts of the first swing beam are respectively rotatably connected to the first frame body connecting part and the first button plate connecting part, and the two second abutting parts are respectively rotatably connected to the second frame body connecting part and the second button plate connecting part.

8. The translational mouse button module according to claim 1, wherein the frame body further comprises a mounting part, and the pressing switch is arranged on the mounting part of the frame body.

9. A mouse device with a translational mouse button module, wherein the mouse device comprises:

a casing, provided with at least one opening;

a frame body, comprising a first frame body connecting part and a second frame body connecting part, wherein the second frame body connecting part is formed along a protruding arm of the frame body;

a button plate, comprising a pressing part, a first button plate connecting part, and a second button plate connecting part;

a pressing switch, configured corresponding to the pressing part and having a button, wherein the pressing part correspondingly abuts against the button; and a side-by-side component, comprising a first swing beam and a second swing beam arranged side by side with each other, wherein the first swing beam is swingably bridged between the first frame body connecting part and the first button plate connecting part, and the first swing beam is configured to swing relative to the frame body with the first frame body connecting part as an axis, the second swing beam is swingably bridged between the second frame body connecting part and the second button plate connecting part, and the second swing beam is configured to swing relative to the frame body with the second frame body connecting part as an axis;

wherein, when the button plate is pressed, the first swing beam and the second swing beam pull the button plate to translate relative to the frame body by swinging relative to the frame body.

10. The mouse device according to claim 9, wherein the second swing beam comprises a rectilinear beam body lying on a side thereof or two rectilinear beam bodies lying on sides thereof, which are spaced apart side by side and connected to each other.

11. The mouse device according to claim 9, wherein the first swing beam comprises two rectilinear beam bodies lying on sides thereof, which are spaced apart side by side and connected to each other.

12. The mouse device according to claim 9, wherein a first direction and a second direction perpendicular to each other are defined, the button plate comprises an elongated plate with a thickness, the first direction corresponds to a length of the button plate, the second direction corresponds to the thickness of the button plate, the second frame body connecting part is located between the first frame body connecting part and the button in the first direction, and a position of the first frame body connecting part in the second direction is higher than positions of the second frame body connecting part and the button.

13. The mouse device according to claim 12, wherein the first swing beam and the second swing beam are spaced side by side in the second direction and staggered from each other in the first direction.

14. The mouse device according to claim 9, wherein the button is configured for elastic reset.

15. The mouse device according to claim 9, wherein the first swing beam comprises two first abutting parts, the second swing beam comprises two second abutting parts, the two first abutting parts of the first swing beam are respectively rotatably connected to the first frame body connecting part and the first button plate connecting part, and the two second abutting parts are respectively rotatably connected to the second frame body connecting part and the second button plate connecting part.

16. The mouse device according to claim 9, wherein the frame body in the translational mouse button module further comprises a mounting part, and the pressing switch is arranged on the mounting part of the frame body.

17. The mouse device according to claim 9, wherein the mouse device further comprises a circuit board, wherein the circuit board is arranged in the casing, and the pressing switch is arranged on the circuit board.

* * * * *